United States Patent [19]

Isaacson

[11] Patent Number: 4,929,032

[45] Date of Patent: May 29, 1990

[54] EMERGENCY SPARE WHEEL AND METHOD AND APPARATUS FOR INSTALLING SAME

[76] Inventor: Manfred A. Isaacson, 2323 Oakway, West Bloomfield, Mich. 48033

[21] Appl. No.: 217,313

[22] Filed: Jul. 11, 1988

[51] Int. Cl.⁵ ............................................. B60B 19/00
[52] U.S. Cl. .................................. 301/38 R; 301/40 S
[58] Field of Search ................. 301/38 R, 39 R, 39 T, 301/40 R, 40 S, 41 R; 105/129

[56] References Cited

U.S. PATENT DOCUMENTS

| 790,853 | 5/1905 | Redd | 105/129 X |
| 913,625 | 2/1909 | David | 105/129 |
| 1,667,820 | 5/1928 | Reinsberg et al. | 301/38 R |
| 1,673,816 | 6/1928 | Emerson et al. | 301/39 R |
| 1,904,081 | 4/1933 | Pratt | 301/38 R |
| 2,145,571 | 1/1939 | O'Donnell | 301/38 R |
| 2,533,869 | 12/1950 | Barfus | 301/38 R |
| 2,777,527 | 1/1957 | Kleem | 301/38 R X |
| 3,770,323 | 11/1973 | Isaacson | 301/38 R |
| 4,350,394 | 9/1982 | Lethinen | 301/38 R |

FOREIGN PATENT DOCUMENTS 191383  6/1937  Switzerland ..................... 301/38 R Primary Examiner—Russell D. Stormer
Attorney, Agent, or Firm—Krass & Young

[57] ABSTRACT

A vehicle spare tire and a method and apparatus for installation of the spare tire on a vehicle wheel and tire assembly without having to remove the flat tire, comprising two identical solid spare tire sections, a lever, and a ramp block. A first spare tire section is mounted to the vehicle wheel face over the flat tire and the lever is engaged with the mounted section to rotate the entire assembly up and over a ramp block until the assembly is supported by the first spare tire section. The lever is then disengaged and a second spare tire section is mounted on the remaining half of the vehicle wheel face to complete the spare.

2 Claims, 2 Drawing Sheets

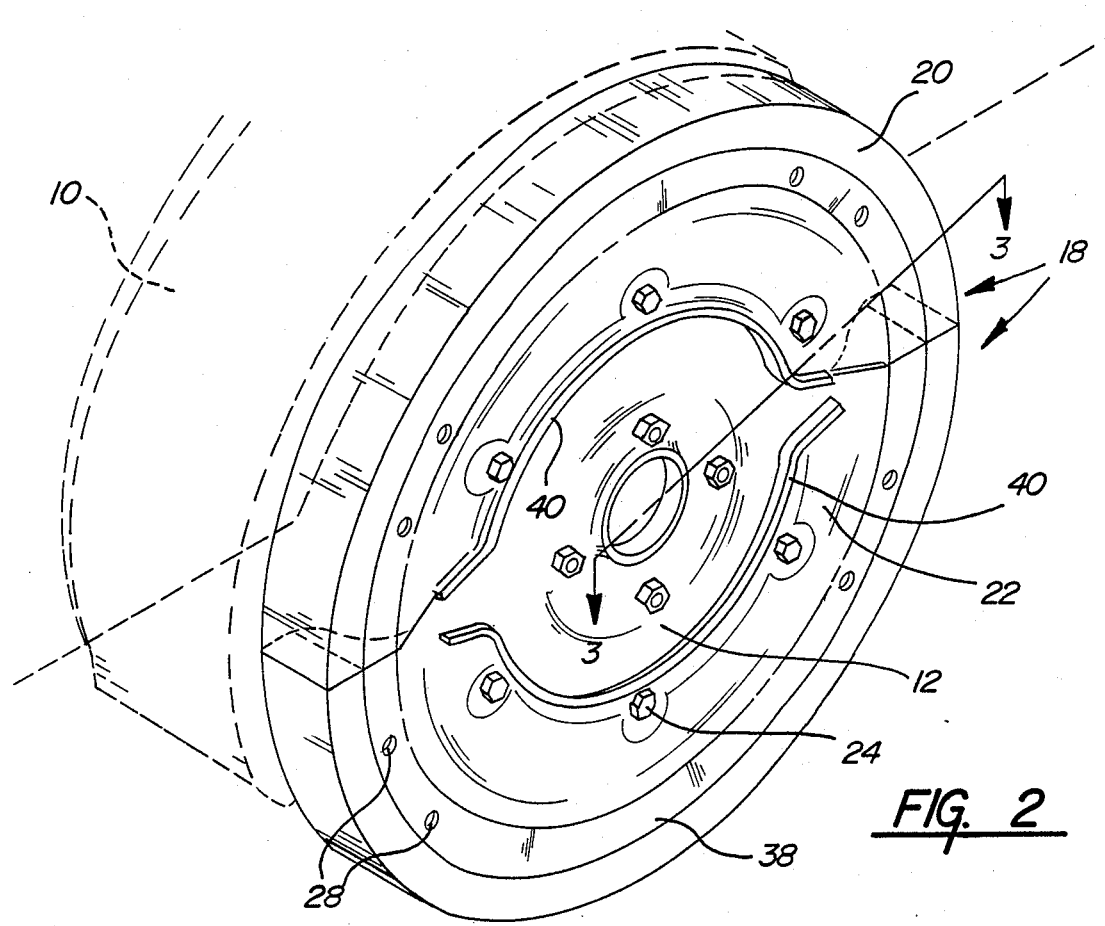
FIG. 2
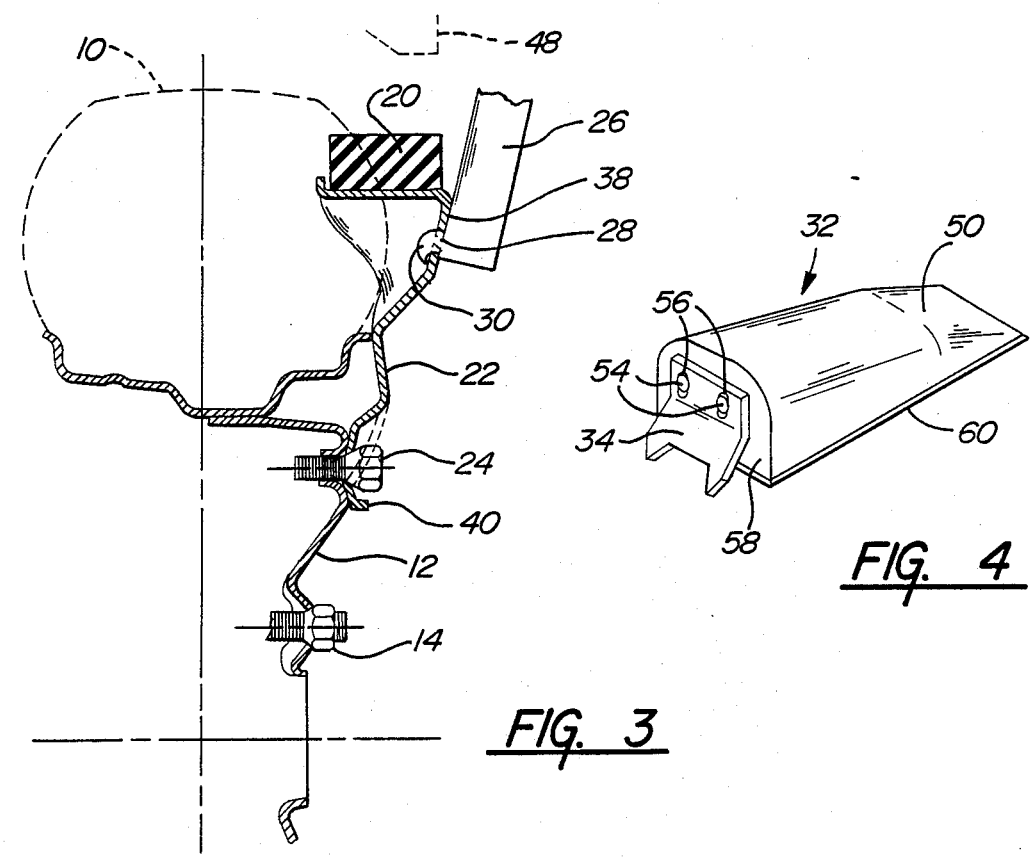
FIG. 3
FIG. 4

EMERGENCY SPARE WHEEL AND METHOD AND APPARATUS FOR INSTALLING SAME

FIELD OF THE INVENTION

My invention relates to emergency or "spare" wheels for vehicles and particularly to a spare wheel which eliminates the need to remove the defective wheel/tire before mounting the spare.

BACKGROUND OF THE INVENTION

Almost every driver has confronted the task of changing a flat tire. This common occurrence usually involves the steps of removing a properly inflated spare wheel/tire from storage, lifting the vehicle with a jack, removing wheel nuts with a wrench, replacing the flat tire with the spare, replacing the wheel nuts, lowering the vehicle back down, and stowing the flat. This can be a dirty, difficult, and even dangerous job. Mud and dirt, rusted and impossibly tight lug nuts, the lifting of heavy spares and flats and the danger of jack failure are all unpleasant, but common, aspects of changing a flat tire.

Various attempts have been made at providing a suitable substitute for the automobile spare tire and for the usual apparatus and method for replacing a flat tire with a spare.

An alternative to the bulky full-size pneumatic spare tire currently in common use is the smaller and lighter temporary spare intended only to allow the vehicle to be driven long enough to reach a gas or repair station. While this concept reduces the weight and size of the spare, elevation of the vehicle and removal of the lug nuts and flat are still required.

A further development has been to provide a temporary spare capable of being mounted on the face of a wheel without the necessity of removing that wheel; see for example U.S. Pat. Nos. 3,866,978, 4,350,394, 4,708,400, and my own U.S. Pat. No. 3,770,323. My earlier patent discloses a spare tire assembly having an eccentric camming section and two semi-circular sections, which sections are adapted to be bolted to the face of the already-installed wheel; i.e., the wheel with the flat tire. Installation requires bolting the eccentric section and one of the semi-circular sections to the flat wheel, moving the vehicle to ride up the rim of the eccentric onto the rim of the full-radius, semi-circular section, stopping the vehicle with the eccentric in a top-most position, and replacing the eccentric with the second semi-circular section.

The principal advantages of my earlier invention are (1) elimination of jacking and the need to remove the wheel with the flat tire, and (2) reducing the normal spare to several smaller, lighter sections which are more easily stored and handled.

SUMMARY OF THE INVENTION

The present invention comprises a lightweight, compact, inexpensive, simple, safe and reliable emergency spare tire system and a method and apparatus for utilizing the same, which method eliminates the need to install and remove a special wheel section, such as the eccentric section of my prior invention, for camming or lifting purposes. My present spare tire invention comprises only two wheel sections, each comprising a bolt-on rim section of full radius and preferably having a solid tire portion of rubber or some other suitable elastomer permanently mounted on the periphery thereof. The two sections are designed to be mounted to the face of the vehicle wheel over and essentially in tandem with the wheel holding the flat tire where, once mounted, the two sections function as a single tire rotating with the standard vehicle wheel and tire assembly.

To deal with the non-circular shape of a flat tire, and the fixed circular shape of the rigid spare tire formed by the mounted spare tire sections, one section is first mounted to the upper half of the vehicle wheel and tire assembly where the flat tire still retains a substantially semi-circular shape. The entire assembly is then rotated such that the vehicle wheel and tire assembly is supported by the first mounted spare tire section in contact with the ground. The second spare tire section is then mounted on the upper half of the vehicle wheel and tire assembly to complete the spare. Nothing need be removed until the driver reaches a service station or other repair facility.

Rotation of the vehicle wheel and tire assembly having the first spare tire section mounted thereon can be accomplished in either two ways. For smaller, lighter cars, a lever means is utilized to engage the first mounted spare tire section and to turn the wheel over a ramp block which effectively lifts the vehicle onto the installed partial wheel section. Alternatively, the car may be lifted under its own power by starting the engine and driving the flat tire over the ramp block. In both cases, the assembly is completed after lifting the vehicle by installing the second partial wheel section in complementary relationship to the first.

The lever has the advantage of being directly observable and more precisely controlled and is the preferred installation method for lighter vehicles.

BRIEF DESCRIPTION OF THE DRAWINGS

FIG. 2 is a perspective view of the two identical spare tire sections of the present invention mounted to a vehicle wheel and tire assembly having a flat tire;

FIG. 3 is a partial front cross-sectional view of the assembly of FIG. 2 further showing the engagement of a lever with a spare tire section and the clearance between the engaged lever and the wheel well or side panel portion of the vehicle; and FIG. 4 is a perspective view of the ramp block of the present invention.

DETAILED DESCRIPTION OF THE ILLUSTRATED EMBODIMENT

Figure 1A:
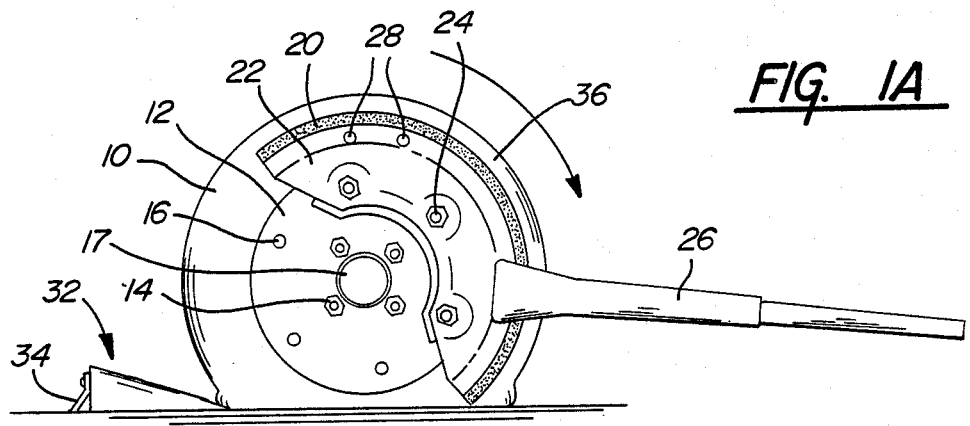
FIGS. 1A–1E are side views of a vehicle wheel and tire assembly with a flat tire. Each successive figure is a separate step in the method for manually mounting the spare tire sections of the present invention to the vehicle wheel face using the lever means and ramp block of the present invention.

Referring first to FIG. 2, a conventional but flat pneumatic vehicle tire 10 is mounted on a stamped steel wheel 12 which is fully mounted on a vehicle wheel hub by means of lug nuts 14. Except for a circle of six tapped holes 16 for receiving spare wheel section mounting bolts 24, wheel 12 may be of conventional construction. Throughout the following description, the reader may assume that the wheel 12, with flat tire 10 in place thereon, remains in the usual association with the vehicle, either front or back, left or right.

Mounted on and to the face of wheel 12 are two identical, semi-circular spare wheel sections 18, making up a nearly full-radius spare wheel having a solid rubber outer "tire" 20 which engages the road in parallel with but outboard of tire 10. Tire 20 is, as is apparent in FIG. 2, made up of two sections, each permanently bonded to its own spare wheel section. In this condition, the vehicle can be driven cautiously to a service station or other repair facility.

Referring now to FIGS. 1A–1E, the vehicle wheel and tire assembly is again shown having a flat tire 10. Six tapped holes (or weld nuts) 16 are formed in the face of vehicle wheel 12 spaced equally and concentrically about wheel center 17. Spare tire sections 18, each having a solid tire portion 20 formed of rubber or other suitable elastomer, and a rigid wheel portion 22 are shown mounted on the vehicle wheel and tire assembly by way of cap screws 24 engaging holes or weld nuts 16. Two pairs of torque holes 28 are formed in the wheel portion 22 of the spare 18 radially outwardly of cap screws 24. Spare section 18 is mounted essentially on the top half of the standard wheel 12 with the vehicle at rest and properly blocked against unwanted movement.

In FIGS. 1A–1D a two-part, telescopic lever 26 is shown in mechanical engagement with a mounted spare tire section 22 for the purpose of rotating the entire vehicle wheel and tire assembly. This mechanical engagement is effected by a pair of projecting hooks 30 (see FIG. 3) formed on the inside face of one end of lever 26 and capable of mating with any of the sets of torque holes 28 formed in wheel portion 22. After hooks 30 have been inserted in holes 28, a person applying force in the direction of the arrow to the end of lever 26 remote from the wheel generates enough torque to rotate the wheel and spare assembly (along with the vehicle itself). Unless the rest position of the vehicle is such as to permit installation of the first spare section as shown in FIG. 1A, the first increment of movement via lever 26 is in the direction of the arrow to bring the right edge of section 22 proximate the road surface. This properly positions the spare section 22 for the following actions.

Figure 1B:
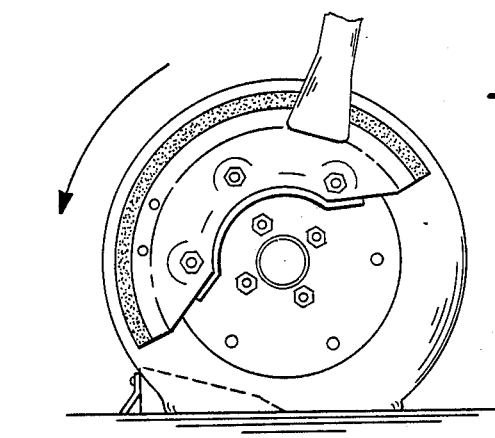
Figure 1C:
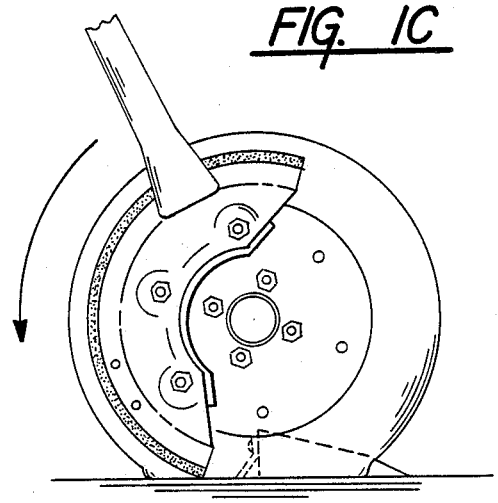

In FIGS. 1A–1C a ramp block 32 is shown being used in conjunction with lever 26. Looking momentarily to FIG. 4, it can be seen that ramp block 32 has a first lower portion 50 having a substantially rectangular cross section and a second upper portion 52 having a rounded cross section approximately the same width as, and designed to nest in, the concave center of a vehicle wheel rim. A pronged foot 34, used to anchor ramp block 32 in the ground to prevent it from sliding on ice or slipping surfaces, is adjustably fastened to ramp end 58 by means of two screws 54 fastened through longitudinal slots 56. This arrangement allows the depth of penetration and the corresponding anchoring power of the pronged foot 34 to be adjusted depending on the surface upon which it rests. Additionally, a coating of ribbed rubber or other material 60 with a high coefficient of friction may be added to the bottom surface of the ramp block 32 to prevent sliding on surfaces too hard or smooth to allow use of the pronged foot 34.

Due to the flattened, irregular, non-circular nature of a flat tire it is generally not possible to apply a rigid, circular spare to a flat tire without elevating the flat tire and wheel. For the same reason it is also not possible to mount both semi-circular spare tire sections 18 simultaneously to wheel 12. However, the present invention circumvents the need for jacking up the vehicle by using an apparatus and method of assembly wherein the two spare tire sections 18 are applied in two separate operations.

Prior to the position of the assembly shown in FIG. 1A, a spare tire section 18 has been mounted on the upper half of a vehicle wheel and tire assembly substantially opposite the flat, ground-contacting portion of the flat tire 10. The choice of six weld nuts 16 in the illustrated embodiment has been chosen to ensure that no matter what the radial position of the vehicle wheel 12 when resting on flat tire 10, enough weld nuts 16 will be sufficiently clear of the ground to permit the mounting of one of spare tire sections 18. However, the number of weld nuts 16 may be varied for different sizes of wheels.

In FIG. 1A, the lever 26 has been engaged with spare tire section 18 via holes 28 and hooks 30 to rotate the entire assembly clockwise until one end of spare tire section 18 is nearly in contact with the ground. Ramp block 32 is then inserted as shown adjacent the ground-contacting portion of flat tire 10 opposite the ground-contacting end of spare tire section 18.

Figure 1D:
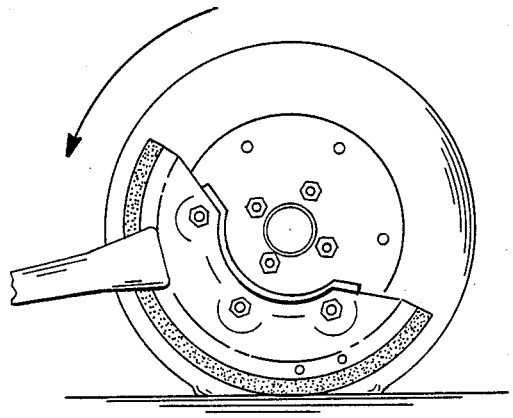
Figure 1E:
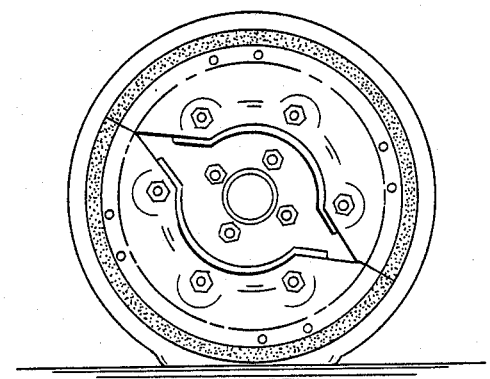

In FIGS. 1B–1D, force is applied counterclockwise by a person to lever 26 to generate torque and rotate the entire assembly in a counterclockwise direction up and over ramp block 32 until flat tire 10 and vehicle wheel 12 are essentially resting on solid tire portion 20 of spare tire section 18. Because the width of rounded upper portion 52 of ramp block 32 is substantially less than the width of flat tire 10, enabling it to nest in the concave center of the rim (not shown) of vehicle wheel 12, the sidewalls of flat tire 10 are prevented from buckling, and the resistance to rotation is substantially reduced. The total length of ramp block 32, comprising the lengths of lower portion 50 and upper rounded portion 52, is designed to be approximately equal to the circumferential length of flat tire 10 in FIG. 1A between the ground-contacting portion of flat tire 10 and the upper, non-ground-contacting end of spare tire section 18. This ensures that the surface of ramp block 32 is long enough to allow the wheel assembly to rotate far enough to smoothly transfer the weight of the vehicle wheel and tire assembly from flat tire portion 10 to the solid tire portion 20 of spare tire section 18 in a continuous rotational application of force. If the ramp block 32 were shorter than the above-mentioned circumferential distance, rigid wheel portion 22 of spare tire section 18 would contact the ground first, causing an abrupt shift in applied force from a smooth, rotational torque to a more linear force requiring substantially more effort on the part of the person using the lever 26. If the ramp block 32 were longer than the above-mentioned circumferential difference, the entire vehicle wheel and tire assembly would drop to the ground rather than smoothly transfer onto the spare tire section 18.

The spare tire sections 18, the lever 26, and the ramp block 32 of the present invention can, of course, be varied with respect to size and capacity to accommodate different vehicles.

Once the vehicle wheel and tire assembly is supported by the first mounted spare tire section 18 (once the solid tire portion is in contact with the ground), lever 26 and hooks 30 can be removed from holes 28 and the second and final spare tire section 18 can be mounted on the remaining weld nuts 16 in vehicle wheel 12 to complete the spare tire. The vehicle is blocked to prevent movement during this step. The parking brake is also preferably engaged.

In FIGS. 1A–1E, it can be seen that a small radial tire portion 36 of flat tire 10 protrudes beyond the solid tire portion 20 of spare tire 18, due to the slightly smaller diameter of spare tire 18 as compared to the vehicle wheel and tire assembly. This protruding tire portion 36 serves to improve traction and soften the ride of the spare tire 18 when the vehicle is in motion.

Referring now to FIG. 2, two spare tire sections 18 forming a complete spare tire are shown mounted by way of cap screws 24 to the face of vehicle wheel 12 having a flat tire 10. Four sets of torque holes 28 into which fit the hooks of a lever can be seen located on an angled surface 38 formed on rigid wheel portion 22. A raised support flange 40 extends along and protrudes from substantially the entire inside edge of rigid wheel portion 22 on each spare tire section 18 to add stiffness and strength to the rigid wheel portion 22. The dotted lines following portions of the circumferences of spare tire 18 and flat tire 10 highlight the difference in diameter between spare tire 18 and flat tire 10. FIG. 2 shows very clearly the complementary relationship between the mounted spare tire sections 18 and the vehicle wheel and tire assembly.

In the cross section of FIG. 3, the internal structure of a spare tire section 18 can be clearly seen. Solid tire portion 20 is bonded or mechanically attached to the rigid wheel portion 22, which in this illustrated embodiment is made from a simple stamping of a metal such as steel. End flange 40 can be seen to extend internally of rigid wheel portion 22, ensuring stiffness and strength in the spare tire. Spare tire section 18 is fastened to vehicle wheel 12 by way of weld nuts 16 and cap screws 24, while the vehicle wheel and tire assembly comprising vehicle wheel 12 and flat tire 10 is mounted on the vehicle wheel hub (not shown) by lug nuts 14 in a well-known manner.

It is important to note that in FIG. 3, that angled surface 38 formed on rigid wheel portion 22 is angled to provide clearance between lever 26 and vehicle wheel well or body portion 48. This allows lever 26 to be engaged to spare tire section 18 by inserting hooks 30 into torque holes 28 and to rotate the vehicle wheel and tire assembly without obstruction or interference from the vehicle body 48. The radially outward location of holes 28 also maximizes lever torque. I have found that for practical-sized components used on a relatively small vehicle, lever forces of only 50 pounds are required to adequately move the vehicle.

In a preferred embodiment of the invention, lever 26 telescopes or collapses to save space in storage. The inner part is preferably steel whereas the outer part may be wood or metal.

OPERATION

In use, a driver having a flat tire stops the vehicle on reasonably level ground and secures the vehicle against unwanted movement. One of the two spare tire sections 18 is first mounted on the upper half of the vehicle wheel 12 having the flat tire 10, after which the lever is engaged with the spare tire section to rotate the entire assembly so that one end of the spare tire section is touching the ground. If the ground is not level, the other wheel section 18 may be used to ensure against excessive movement in the downhill direction. Next, the ramp block 32 is placed on the ground adjacent the flat tire 10 opposite the ground-contacting portion of the spare tire section 18 and aligned with the center of the vehicle wheel 12. Applying force to the lever 26, the driver simply rotates the entire wheel and spare assembly (along with the vehicle) up and over the ramp block 32 until the spare tire section 18 is on the ground and supporting the vehicle wheel and flat tire. The ramp block 32 can then be used for a stop block while the lever is disengaged and the remaining spare tire section is mounted.

The entire apparatus of the present invention is inexpensive and lightweight, weighing approximately 25% less than the temporary spare tires currently in use. The spare wheel sections, the lever, and the ramp block are also very compact and can be stored in otherwise unused space in a vehicle such as the quarter panel, over the axle kick-up, or even in the engine compartment.

It is to be understood that the foregoing description of the illustrated embodiment is not intended to be limiting, and that various modifications of the illustrated embodiment lie within the scope of the invention. For example, the movement of the vehicle can be effected by the effected by the engine power of the vehicle rather than lever 26; this is desirable in the case of larger heavy vehicles. Wheel sections 18 need not be identical; i.e., one section could extend over an included angle of greater than 180°, while the other section is correspondingly smaller. Identical sections are preferred, however. Holes 16 in wheel 12 may be concealed with a wheel cover, with plugs or with decorative temporary wheel nuts.

I claim:

1. A method for mounting a spare tire on a vehicle wheel and tire assembly having a flat tire without removing the flat tire from the vehicle wheel, wherein the spare tire comprises two complemental sections having ground-engaging peripheral portions and, together, forming a circular spare tire, comprising the following steps:
   mounting a first spare tire section on an upper part of said vehicle wheel and tire assembly such that the spare tire section is not in contact with the ground;
   placing a ramp block adjacent the ground-contacting portion of said flat tire opposite the ground-contacting end of said first spare tire section, said ramp block being of sufficient height to elevate the vehicle onto the ground engaging portion of the installed spare tire section;
   applying torque to rotate said vehicle tire and wheel assembly up, over and beyond said ramp block such that said vehicle tire and wheel assembly is essentially resting upon the ground-engaging portion of said first spare tire section; and, thereafter,
   mounting a second spare tire section complemental with the first section on said vehicle wheel and tire assembly.

2. A method for mounting a two-part spare tire on a vehicle wheel and tire assembly as defined in claim 1 wherein the movement of the vehicle and consequent rotation of said vehicle wheel and tire assembly is accomplished by applying force to a lever which engages said first spare tire section mounted on said vehicle wheel and tire assembly.

* * * * *